(12) United States Patent
Makhoul et al.

(10) Patent No.: US 11,929,688 B2
(45) Date of Patent: Mar. 12, 2024

(54) CLASS PHI-2 POWER CONVERTER COMPRISING A SELF-OSCILLATING SWITCH CONTROL CIRCUIT

(71) Applicants: COMMISSARIAT A L'ENERGIE ATOMIQUE ET AUX ENERGIES ALTERNATIVES, Paris (FR); INSTITUT POLYTECHNIQUE DE GRENOBLE, Grenoble (FR)

(72) Inventors: Rawad Makhoul, Grenoble (FR); Pierre Perichon, Grenoble (FR); Xavier Maynard, Grenoble (FR); Jia Zhuang, Grenoble (FR); Yves Lembeye, Saint Georges de Commiers (FR)

(73) Assignees: COMMISSARIAT A L'ENERGIE ATOMIQUE ET AUX ENERGIES ALTERNATIVES, Paris (FR); INSTITUT POLYTECHNIQUE DE GRENOBLE, Grenoble (FR)

(*) Notice: Subject to any disclaimer, the term of this patent is extended or adjusted under 35 U.S.C. 154(b) by 360 days.

(21) Appl. No.: 17/298,938

(22) PCT Filed: Dec. 4, 2019

(86) PCT No.: PCT/EP2019/083604
§ 371 (c)(1),
(2) Date: Jun. 1, 2021

(87) PCT Pub. No.: WO2020/115100
PCT Pub. Date: Jun. 11, 2020

(65) Prior Publication Data
US 2022/0038030 A1    Feb. 3, 2022

(30) Foreign Application Priority Data

Dec. 5, 2018 (FR) .................................... 1872357

(51) Int. Cl.
H02M 1/08       (2006.01)
H02M 7/48       (2007.01)
H02M 7/53846    (2007.01)

(52) U.S. Cl.
CPC ....... H02M 7/538466 (2013.01); H02M 1/08 (2013.01); H02M 7/4815 (2021.05)

(58) Field of Classification Search
CPC ............ H02M 1/08; H02M 7/42; H02M 7/48; H02M 7/4815
See application file for complete search history.

(56) References Cited

U.S. PATENT DOCUMENTS 10,917,080 B2 *   2/2021   Yanagi .................. H03K 17/04

OTHER PUBLICATIONS

Choi, et al., "High-Frequency, High-Power Resonant Inverter With eGaN FET for Wireless Power Transfer", IEEE Transactions on Power Electronics, vol. 33, Issue: 3, pp. 1890-1896, Mar. 2018.
(Continued)

Primary Examiner — Gary L Laxton
(74) Attorney, Agent, or Firm — BakerHostetler

(57) ABSTRACT

A power converter for converting a DC input voltage into an AC output voltage, the power converter having a structure of Phi-2 type, and includes an input terminal for the DC input voltage, an output terminal for the AC output voltage, a power switch equipped with a control electrode, a first electrode and a second electrode linked to a reference potential, the power switch being configured to receive a drive signal at the control electrode, the converter further comprising a self-oscillating circuit, connected between the output terminal and the control electrode, and configured to supply and maintain a sinusoidal drive signal to the power switch from the output voltage.

3 Claims, 3 Drawing Sheets

(56) References Cited

OTHER PUBLICATIONS

Sun, et al., "Review of Resonant Gate Driver in Power Conversion", 2018 International Power Electronics Conference (IPEC-Niigata 2018—ECCE Asia), pp. 607-613, May 20, 2018.
Kitazawa, et al., "Analysis and Design of the Class-Φ2 Inverter", IECON 2018—44th Annual Conference of the IEEE Industrial Electronics Society, pp. 1023-1028, Oct. 21, 2018.
Andersen, et al., "A VHF class E DC-DC converter with self-oscillating gate driver", 2011 Twenty-Sixth Annual IEEE Applied Power Electronics Conference and Exposition (APEC), pp. 885-891, Mar. 5, 2011.
Han, et al., "Resistance Compression Networks for Radio-Frequency Power Conversion", IEEE Transactions on Power Electronics, vol. 22, No. 1, pp. 41-53, Jan. 2007.
Rivas, et al., "A high-frequency resonant inverter topology with low-voltage stress", IEEE Transactions on power electronics, vol. 23, No. 4, Jul. 2008.

\* cited by examiner

CLASS PHI-2 POWER CONVERTER COMPRISING A SELF-OSCILLATING SWITCH CONTROL CIRCUIT

CROSS-REFERENCE TO RELATED APPLICATIONS

This application is a National Stage of International patent application PCT/EP2019/083604, filed on Dec. 4, 2019, which claims priority to foreign French patent application No. FR 1872357, filed on Dec. 5, 2018, the disclosures of which are incorporated by reference in their entirety.

FIELD OF THE INVENTION

The invention relates to a DC/AC power converter with high or very high switching frequency. The invention is applicable in particular to the conversion of a DC voltage into an AC or DC voltage, within the HF (from 3 to 30 MHz) and VHF (from 30 to 300 MHz) radiofrequency ranges. The switching of the converter in the radiofrequency ranges makes it possible to reduce the size of the reactive components (inductors, capacitors) of the power conversion circuits, and to thus reduce the overall volume of the power conversion chain, which can be advantageous for applications in which the compactness and the weight are important constraints.

BACKGROUND

In DC/AC power converters (also called inverters), the switching is performed with a power switch, for example a GaN (gallium nitride) transistor or an MOS transistor. The transistor switches from the on state to the off state or vice versa, using a driving circuit called gate driver circuit. As a general rule, in power converters, one or more resistors can be added to the gate of the transistor in order to control the voltage or current variations on the transistor when the converter is started up (so-called non-resonant structure). On each switching command transmitted by the gate driver circuit to the transistor, there is an energy dissipation in the resistor or resistors added to the gate of the transistor. For switching frequencies of the order of ten or a hundred or so kHz, the sum of the losses due to the dissipation can be considered as negligible over a given duration. On the other hand, over the same duration, the sum of the losses due to the dissipation is very much greater for switching frequencies of the order of ten or a hundred or so MHz. In order to reduce this kind of dissipation, and consequently avoid degrading the efficiency of the converter, a so-called resonant structure can be employed, based on passive energy storage components (capacitors and inductors), instead of using a non-resonant structure. The resonant structure, contrary to the non-resonant structure, allows energy to be stored during a switching phase of the transistor, and to be restored during the next phase instead of dissipating it into the interference elements of the transistor.

Among the DC/AC converters known from the state of the art, the Phi-2 class converter (φ2) offers numerous advantages. The Phi-2 class converter is described notably in the document "*A high-frequency resonant inverter topology with low-voltage stress*" (Rivas et al., IEEE Transactions on power electronics, vol. 23, No. 4, July 2008). The PHI-2 class converter, illustrated by FIG. 1, comprises an input inductor Lf, connected to the voltage source Vin to be converted, and having a value of the same order of magnitude as the inductor Lr of a series resonant network Lr—Cr connected between the drain of the transistor and the load. It also comprises an Lmr-Cmr filter, the resonance frequency of the Lmr-Cmr filter being equal to twice the switching frequency of the transistor. The Lmr-Cmr filter is added in parallel to the transistor in order to short-circuit the second harmonic of the drain-source voltage of the transistor and thus reduce the voltage strain on the transistor. Such a structure can easily be integrated on a printed circuit, because of the lower value of the input inductor Lf. The absence of a high-value inductance also allows a shorter transient to be obtained than in other types of converters, notably those of class E, which can be advantageous for handling rapid power demands in the converter. The different values of the components of the converter are notably selected so that, upon the switching of the transistor, the voltage Vds is virtually zero, in order to observe the soft-switching condition, or zero-voltage switching (ZVS) condition.

In zero-voltage switching (ZVS), the values of the components of the resonant network and of the output capacitance Cf (also called shunt capacitance) of the transistor are selected such that the voltage Vds at the terminals of the transistor is zero each time the transistor switches, from the on state to the off state and vice versa. Since the losses in a transistor are due to the product of the voltage at its terminals by the current passing through it, a zero voltage on each switchover allows the losses to be minimized.

In a Phi-2 class converter, the drain-source voltage is also equal to approximately two times the input voltage Vin, which limits the voltage strain on the transistor. By reducing the voltage strain, it is then possible to either gain in efficiency, with an on-state resistance $R_{DSON}$ lower than for a class E converter, or to gain in compactness, by reducing the size of the chip on which the various elements of the conversion circuit are located. Furthermore, the lower voltage strain allows the stray capacitance to be considered more stable in value, which facilitates the modeling thereof.

The control of switching of the transistor can be performed by a gate driver circuit CP designed in the form of an integrated circuit on an electronic chip, as illustrated by FIG. 1. However, this type of gate driver circuit is not suited to switching frequencies higher than 30 MHz, and in particular higher than 35 MHz. Indeed, beyond this frequency, the delays introduced by the internal circuits (logic gates) of the gate driver circuit CP become predominant, and the gate driver circuit CP is no longer able to lower the drive signal below the threshold voltage Vth of the transistor (1.3 V for a GaN transistor). The transistor can then no longer switch, and the converter no longer operates.

SUMMARY OF THE INVENTION

The invention therefore aims to dispense with active components and logic gates for the control of a transistor in a converter of Phi-2 structure.

One subject of the invention that allows this aim to be achieved, partially or totally, is a power converter for converting a DC input voltage into an AC output voltage, the power converter having a structure of Phi-2 type, and comprising:
- an input terminal for the DC input voltage,
- an output terminal for the AC output voltage,
- a power switch equipped with a control electrode, a first electrode and a second electrode linked to a reference potential, the converter further comprising a self-oscillating circuit, connected between the output terminal and the control electrode, and configured to supply and maintain a sinusoidal drive signal to the control electrode of the power switch from the output voltage.

Advantageously, the self-oscillating circuit comprises a first capacitive divider bridge connected between the output terminal and the reference potential, and further comprises a first inductor connected on one side to a first midpoint of the capacitive divider bridge and on the other side to the control electrode via a reactive circuit.

Advantageously, the converter comprises a second inductor connected to the output terminal, a first capacitor connected between the output terminal and the reference potential, the second inductor, the first capacitor and the first capacitive divider bridge being configured to form an "L" configuration impedance matching network for a predefined load value at the output of the converter.

Advantageously, the reactive circuit is formed by a second capacitor connected to the control electrode and by the stray capacitance between the control electrode and the second electrode of the power switch.

Advantageously, the reactive circuit comprises at least one series resonant circuit, connected between the control electrode and the reference potential, and the resonance frequency of which is equal to a corresponding harmonic frequency of the drive signal.

Advantageously, the converter comprises a resistive divider bridge connected between the input terminal and the reference potential, having a second midpoint connected to the first inductor and to the reactive circuit, the resistive divider bridge being configured to supply a DC component derived from the input voltage, the DC component being equal to a threshold voltage between the control electrode and the second electrode of the power switch.

BRIEF DESCRIPTION OF THE DRAWINGS

Other features, details and advantages of the invention will emerge on reading the description given with reference to the attached drawings which are given by way of example.

DETAILED DESCRIPTION

The invention is described in the case where the power switch is a field-effect transistor (for example MOSFET, JFET). The substrate of the transistor can be made of gallium nitride (GaN), of silicon carbide (SiC), or with any other semiconductor material. The drain, the source and the gate mentioned in the description can be designated more generally respectively as a first electrode, a second electrode and a control electrode. The invention can thus also be applied to other types of power switches, for example a transistor of IGBT type, a bipolar transistor or even a thyristor.

A Phi-2 class converter is generally dimensioned to deliver an output power Pout with a desired load impedance Rdes, from a DC input voltage Vin, with a switching frequency $f_{switch}$. The power radiofrequency loads available on the market do not necessarily have a nominal load impedance Rfab equal to the desired load impedance Rdes.

In this case, an impedance matching between the desired load impedance Rdes and the nominal load impedance Rfab must thus be performed. In other cases, for a desired load impedance Rdes, it is not possible to dimension a Phi-2 class converter which allows a certain output power value to be obtained. To obtain the desired output power, it is therefore necessary to use another load value and to match the impedance. The impedance matching can even be performed when the desired load Rdes and the nominal load Rfab are theoretically equal, because of the different interfering elements that the circuit can comprise.

Figure 1:
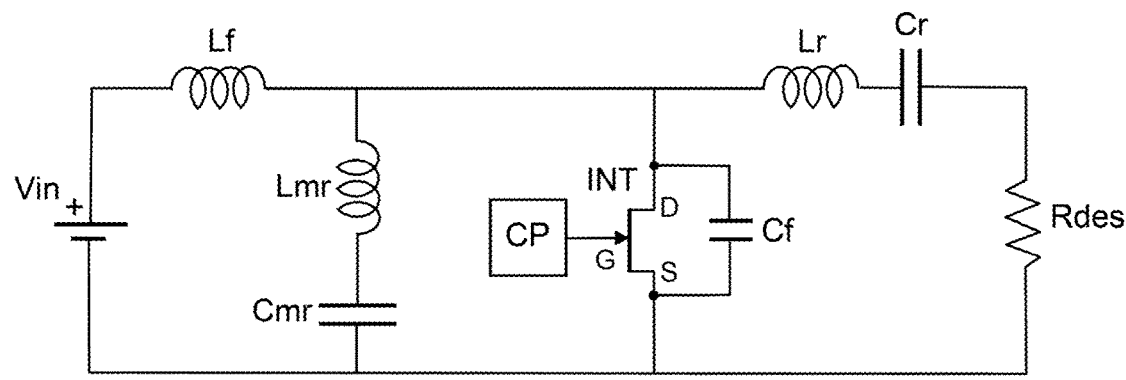
FIG. 1, already described, represents a Phi-2 class converter according to the state of the art.
Figure 2:
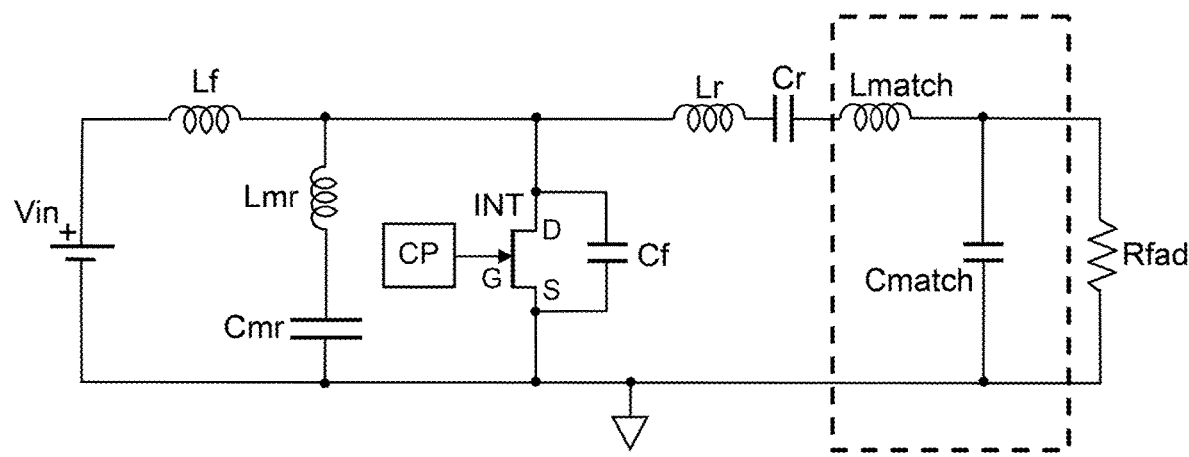
FIG. 2 represents a Phi-2 class converter according to the state of the art, comprising an impedance matching network.

In this case, as FIG. 2 illustrates, it is suitable to insert an "L" configuration impedance matching circuit, comprising an impedance matching inductor Lmatch and an impedance matching capacitor Cmatch.

The article *"Resistance Compression Networks for Radio-Frequency Power Conversion"* (Y. Han, O. Leitermann, D. A. Jackson and D. J. Perreault, IEEE Transactions On Power Electronics, Vol. 22, No. 1, January 2007) describes a method for determining an impedance matching circuit.

Figure 3:
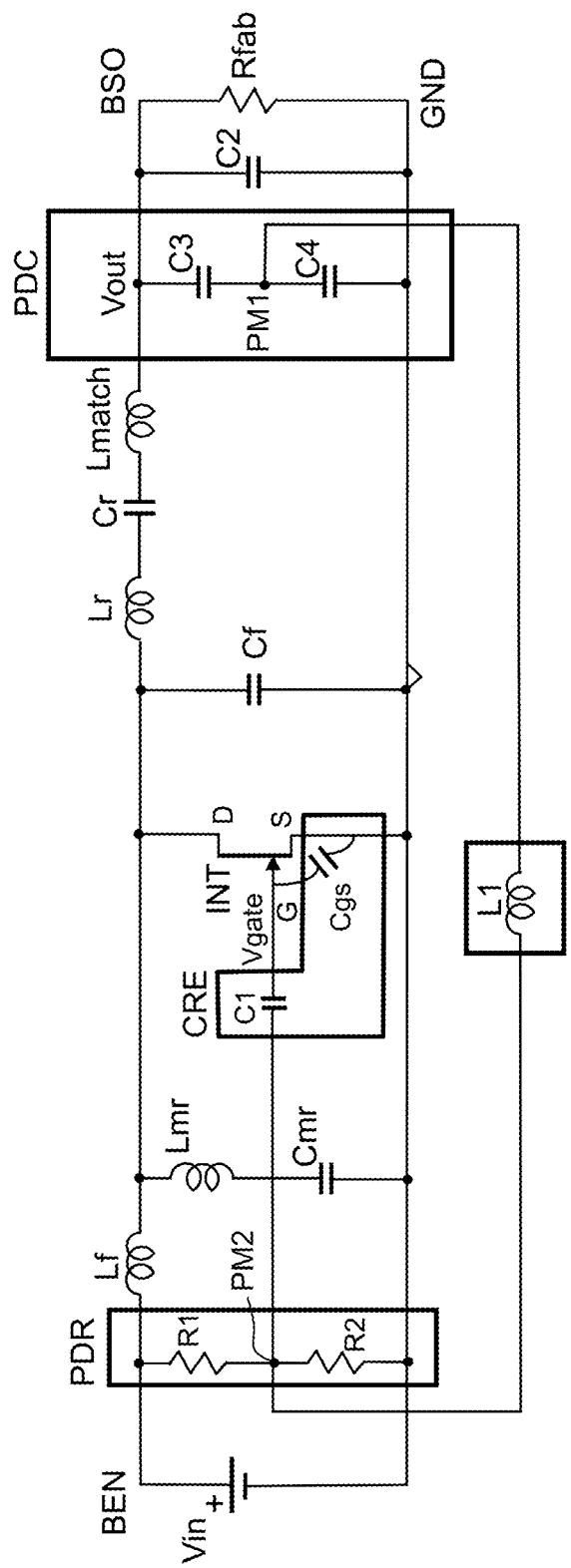
FIG. 3 represents a first embodiment of a Phi-2 class converter according to the invention.

FIG. 3 represents a first embodiment of a Phi-2 class converter according to the invention. In the Phi-2 class converter according to the invention, the impedance matching capacitor Cmatch of the "L" configuration impedance matching circuit is replaced by an equivalent network of capacitors C1-C3-C4. The first capacitor C1 is in parallel with the capacitor C3 in series with the capacitor C4. A capacitive divider bridge PDC is obtained by taking a voltage between a first intermediate point PM1, situated between the capacitors C3 and C4, and a reference potential GND (for example a ground). The manufacturer's load Rfab is situated between the output terminal BSO and the reference potential GND. The output voltage Vout can be measured at the terminals of the manufacturer's load Rfab. The capacitive divider bridge PDC and the manufacturer's load Rfab are connected in parallel. Thus, a fraction of the output voltage Vout is taken at the terminals of the capacitor C4. The fraction of the output voltage Vout is calculated in order to supply a voltage level close to the drive voltage of the transistor INT. The output voltage Vout is a sinusoid, which has to be brought to a value that is acceptable by the gate of the transistor INT (approximately 6 V for a GaN transistor), centered around the value of the threshold voltage Vth of the transistor INT.

A second capacitor C2 is directly connected to the gate G of the transistor INT. The reactive circuit CRE, formed by the first capacitor C1 and by the input capacitance Cgs of the transistor INT, forms another capacitive divider bridge, to further reduce the gate drive voltage. The second capacitor C2 also has a function of filtering of the DC component of the gate voltage Vgs.

A first inductor L1 is connected to the intermediate point PM1 of the capacitive divider bridge PDC. The first inductor L1 forms an oscillating network with the capacitor C4, the second capacitor C2 and the gate-source capacitance Cgs of the transistor INT. The value of the first inductor L1 is determined such that the oscillation frequency of the oscillating network is equal to the desired switching frequency of the transistor INT. This value will however be able to be corrected, to take account of the dimensioning of the other components. The value of the first inductor L1 is also determined so as to add a phase shift to the output signal, so as to observe the zero-voltage switching (ZVS) condition.

The voltage Vgs is not linear: it does not increase linearly, as a function of the total load of the gate. The level of the voltage Vgs is equal to the Miller voltage (voltage value corresponding to the Miller plateau), and which designates the voltage necessary to recharge the drain-gate capacitance of the transistor Cgd, also called Miller capacitance. Outside of this level, the voltage Vgs increases, with the same slope before and after the level, proportionally to the total load. Thus, the voltage Vgs obtained on the gate G of the transistor INT cannot be centered around the threshold voltage Vth. In the worst case, the voltage Vgs can be constantly lower than the threshold voltage Vth, which would prevent any switching of the transistor INT.

To compensate for the nonlinearity of the voltage Vgs, a resistive divider bridge PDR is connected between the input terminal BEN and the reference potential GND. The resistive divider bridge PDR comprises a first resistor R1 in series with a second resistor R2. A second midpoint PM2 is disposed between the first resistor R1 and the second resistor R2. A fraction of the DC input voltage Vin is taken at the second midpoint PM2. This fraction is added to the sinusoidal component extracted from the output voltage Vout. The addition of a DC component to the sinusoidal component provides an assurance of the gate drive signal oscillating about the threshold voltage Vth of the transistor INT.

The second resistor R2 can be a variable resistor. The adjustment of the value of the second resistor R2 allows the efficiency of the converter to be finely varied.

The drive circuit of the gate of the transistor INT is therefore self-oscillating in that it creates and maintains the oscillations necessary to the switching of the transistor INT.

Figure 4:
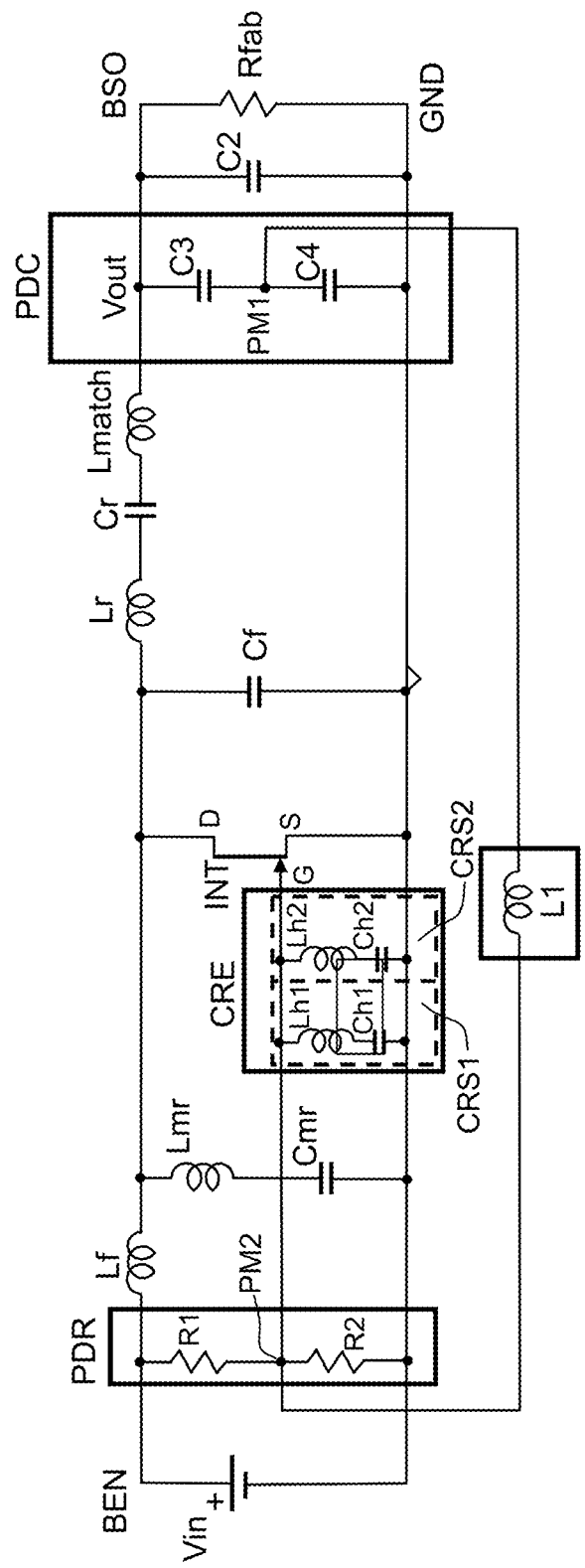
FIG. 4 represents a second embodiment of a Phi-2 class converter according to the invention.

FIG. 4 illustrates a variant of the converter according to the invention.

The converter according to this variant also comprises a capacitive divider bridge PDC, and a first inductor L1.

The reactive circuit CRE is composed of at least one series resonant circuit. In FIG. 4, two series resonant circuits (CRS1, CRS2) are illustrated, but the presence of a single series resonant circuit can be envisaged. Each of the series resonant circuits is connected between the gate of the transistor INT and the reference potential GND. Each of the series resonant circuits is composed of an inductor (Lh1, Lh2) and a capacitor (Ch1, Ch2). The values of the inductor and of the capacitor of a first series resonant circuit CRS1 are determined such that the resonance frequency of the first series resonant circuit is equal to the frequency of the harmonic of highest amplitude (after that of rank 1, which corresponds to the fundamental component) of the gate voltage of the transistor INT. Thus, the inductor and the capacitor of the first series resonant circuit short-circuit the highest harmonic. Likewise, a second series resonant circuit CRS2 (of rank 2) can be disposed in parallel to the first series resonant circuit CRS1. The values of the inductor and of the capacitor of the second series resonant circuit are determined such that the resonance frequency of the second series resonant circuit is equal to the frequency of the second highest harmonic of the gate voltage of the transistor INT. Other series resonant circuits of the same order can be disposed in parallel. The gate signal is thus rendered more sinusoidal by eliminating the harmonics which distort it, which provokes a more rapid switching on or switching off of the transistor INT, which contributes to enhancing the efficiency of the converter.

A resistive divider bridge is connected between the input terminal BEN and the reference potential GND, in order to add a DC component and center, if necessary, the sinusoid of the control signal of the gate about the threshold voltage Vth.

The drive signal is thus primarily composed of its fundamental component, of sinusoidal form. The driving of the gate by a sinusoid allows a better switching of the transistor, and a higher efficiency, to be obtained.

The converter that is the subject of the invention, according to one or other of the variants, contains only passive components, with no additional DC source. Finally, it contains no transistor other than that necessary to the Phi-2 structure, which avoids having to manage dead times. As a reminder, the management of the dead times is necessary when there are at least two transistors connected in series, in parallel with a voltage source, in order to avoid the presence of short-circuits when two transistors are on at the same time. At high and very high frequency, the switching period is so low that it becomes of the same order of magnitude as the dead times necessary to the correct operation of the circuit, which increases the complexity of the management of the dead times.

The converter described previously can form part of a DC/DC conversion device by connecting, for example, the output of the converter to a transformation stage, which would itself be connected to a rectifier.

The following section describes an example of dimensioning of the converter that is the subject of the invention, according to the embodiment illustrated by FIG. 3, for an input voltage Vin of 30 V, an output power of 30 W, and a desired switching frequency $f_{switch}$ of 40 MHz.

The dimensioning of the input inductor Lf, of the series resonant network Lr—Cr and of the filter Lmr-Cmr is described in the document "*A high-frequency resonant inverter topology with low-voltage stress*" (Rivas et al., IEEE Transactions on power electronics, vol. 23, No. 4, July 2008).

The following are obtained: Lf=50 nH, Lmr=35 nH, Cmr=113 pF, Lr=50 nH, Cr=2 nF.

The dimensioning of the matching circuit {Lmatch-Cmatch} is described in the article "*Resistance Compression Networks for Radio-Frequency Power Conversion*" (Y. Han, O. Leitermann, D. A. Jackson and D. J. Perreault, IEEE Transactions On Power Electronics, Vol. 22, No. 1, January 2007).

The following are obtained: Lmatch=79 nH, Cmatch=165 pF.

The capacitor Cmatch is divided into C1 parallel with (C3 in series with C4), so as to obtain an impedance for the branch (C3 in series with C4) that is very generously dimensioned (approximately ten times greater) with respect to the output load, in order not to deprive the load of the power that it should receive.

The capacitive divider bridge PDC must be dimensioned to bring the voltage Vout to within the region of 6 V (the drive voltage of the transistor). The following two dimensioning equations are thus obtained:

[Math. 1]

$$\frac{1}{2\pi \cdot f_{switch} \cdot (C3 + C4)} \gg 10 \cdot R_{fab} \quad (1)$$

[Math. 2]

$$\frac{C3}{C3 + C4} > \frac{V_{div}}{V_{out}} \quad (2)$$

In which $V_{div}$ is equal to the voltage between the first midpoint PM1 and the reference potential GND, and Rfab is the load impedance supplied by the manufacturer.

The following are found: C3=10 pF, C4=100 pF.

To find the value of the first inductor L1, the first step is to calculate the equivalent capacitance Ceq of the gate capacitance Cgs and of the second capacitor C2.

Then, starting from $f_{switch}=f_{oscillation}$ (in which $f_{oscillation}$ is the resonance frequency of the circuit L1-Ceq), the following equation is obtained:

[Math. 3]

$$f_{switch} = \frac{1}{2\pi \cdot \sqrt{L1 \cdot Ceq}} \quad (3)$$

It is found that L1=200 nH, this value is provisional and will be modified upon the introduction of the second capacitor C2.

The second capacitor C1 is introduced in order to produce another voltage divider at the gate of the transistor INT. Cgs is given by the datasheet of the transistor INT and the value of the second capacitor C2 is determined by the equation:

[Math. 4]

$$\frac{C2}{C2 + Cgs} = \frac{V_{gs}}{V_{osc}} \quad (4)$$

In which $V_{gs}$ represents the voltage between the gate and the reference potential GND, and $V_{osc}$ represents the voltage between the second midpoint PM2 and the reference potential GND.

C2=300 pF is obtained, and the value of the first inductor L1 is adjusted to 230 nH by using the simulation in order to maintain $f_{oscillation}$ at 40 MHz.

The invention claimed is:

1. A power converter for converting a DC input voltage (Vin) into an AC output voltage (Vout), the power converter having a structure of Phi-2 type, and comprising:
    an input terminal (BEN) for the DC input voltage (Vin),
    an output terminal (BSO) for the AC output voltage (Vout),
    a power switch (INT) equipped with a control electrode (G), a first electrode (D) and a second electrode (S) linked to a reference potential (GND),
    wherein the converter further comprises a self-oscillating circuit, connected between the output terminal (BSO) and the control electrode (G), and configured to supply and maintain a sinusoidal drive signal to the control electrode of the power switch (INT) from the output voltage,
        the self-oscillating circuit comprising a capacitive divider bridge (PDC) connected between the output terminal (BSO) and the reference potential (GND), and further comprising a first inductor (L1) connected on a first side to a first midpoint (PM1) of the capacitive divider bridge (PDC) and on a second side to the control electrode (G) via a reactive circuit (CRE),
        the reactive circuit (CRE) comprising at least one series resonant circuit (CRS1, CRS2), connected between the control electrode (G) and the reference potential (GND), and the resonance frequency of which is equal to a corresponding harmonic frequency of the drive signal.

2. The converter as claimed in claim 1, the reactive circuit (CRE) being formed by a second capacitor (C2) connected to the control electrode (G) and by the stray capacitance (Cgs) between the control electrode (G) and the second electrode (S) of the power switch (INT).

3. The converter as claimed in claim 1, comprising a resistive divider bridge (PDR), connected between the input terminal (BEN) and the reference potential (GND), having a second midpoint (PM2) connected to the first inductor (L2) and to the reactive circuit (CRE), the resistive divider bridge (PDR) being configured to supply a DC component derived from the input voltage (Vin), the DC component being equal to a threshold voltage between the control electrode (G) and the second electrode (S) of the power switch (INT).

* * * * *

UNITED STATES PATENT AND TRADEMARK OFFICE
CERTIFICATE OF CORRECTION

PATENT NO. : 11,929,688 B2
APPLICATION NO. : 17/298938
DATED : March 12, 2024
INVENTOR(S) : Rawad Makhoul et al.

Page 1 of 1

It is certified that error appears in the above-identified patent and that said Letters Patent is hereby corrected as shown below:

In the Claims

In Claim 1, Column 8, Line 10, "from the output voltage," should be -- from the output voltage (Vout), --.

Signed and Sealed this
Fourth Day of June, 2024

Katherine Kelly Vidal
Director of the United States Patent and Trademark Office